(12) United States Patent
Hamdoon et al.

(10) Patent No.: US 10,836,280 B2
(45) Date of Patent: Nov. 17, 2020

(54) LOCKING ELEMENT FOR A LID TO A STORAGE AREA IN A SEATBACK OF A VEHICLE

(71) Applicant: Ford Global Technologies, LLC, Dearborn, MI (US)

(72) Inventors: Muhsin M. Hamdoon, Windsor (CA); Marwan Ahmad Elbkaily, Canton, MI (US); Shravan Kumar Sabbani, Novi, MI (US); Jeffrey Vonlinsowe, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 47 days.

(21) Appl. No.: 16/059,449

(22) Filed: Aug. 9, 2018

(65) Prior Publication Data

US 2020/0047645 A1 Feb. 13, 2020

(51) Int. Cl.
*B60N 2/20* (2006.01)
*B60N 3/00* (2006.01)
(Continued)

(52) U.S. Cl.
CPC .............. *B60N 2/206* (2013.01); *B60N 2/919* (2018.02); *B60N 3/004* (2013.01); *B60R 7/043* (2013.01);
(Continued)

(58) Field of Classification Search
CPC .......... B60N 2/206; B60N 2/90; B60N 2/919; B60N 2002/948; B60N 2002/971;
(Continued)

(56) References Cited

U.S. PATENT DOCUMENTS 4,346,924 A * 8/1982 Herriott .............. E05B 65/5292
206/1.5
4,652,029 A * 3/1987 Yamamoto .......... E05B 65/5292
292/252
(Continued)

FOREIGN PATENT DOCUMENTS

DE 102017120445 A1 * 3/2018 .............. B60N 2/36
FR 2846604 A1 5/2004
(Continued)

*Primary Examiner* — Ryan D Kwiecinski
(74) *Attorney, Agent, or Firm* — David Coppiellie; Price Heneveld LLP

(57) ABSTRACT

A seatback for a vehicle comprises: a lid having a closed position preventing access to a storage area and an open position allowing access to the storage area; and a locking element having an engaged position that prevents the lid from transitioning from the closed position to the open position and a disengaged position that does not prevent the lid from transitioning from the closed position to the open position; wherein, the locking element transitions from the disengaged position to the engaged position via the force of gravity when the seatback transitions from a fold down position to an upright position, and transitions from the engaged position to the disengaged position when the seatback transitions from the upright position to fold down
(Continued)

position. The lid can pivot upward from a rearward portion of the seatback in the fold down position, as the lid transitions to the open position.

20 Claims, 17 Drawing Sheets

(51) Int. Cl.
  *B60R 7/04* (2006.01)
  *E05B 83/32* (2014.01)
  *B60N 2/90* (2018.01)
  *B60R 11/00* (2006.01)

(52) U.S. Cl.
  CPC ........ *E05B 83/32* (2013.01); *B60N 2002/971* (2018.02); *B60R 2011/0015* (2013.01); *Y10S 292/04* (2013.01); *Y10S 292/22* (2013.01); *Y10T 292/1007* (2015.04); *Y10T 292/1013* (2015.04); *Y10T 292/18* (2015.04)

(58) Field of Classification Search
  CPC .......... B60N 3/001; B60N 3/004; B60R 7/04; B60R 7/043; B60R 2011/0007; B60R 2011/0015; Y10T 292/1006; Y10T 292/1007; Y10T 292/1013; Y10T 292/175; Y10T 292/18; Y10T 292/696; Y10T 292/71; Y10S 292/22; Y10S 292/65; Y10S 292/04; Y10S 292/11; Y10S 292/73; E05B 63/122; E05B 63/128; E05B 83/28; E05B 83/32
  USPC .................................. 296/37.16, 37.8, 37.15
  See application file for complete search history.

(56) References Cited

U.S. PATENT DOCUMENTS

| | | | | |
|---|---|---|---|---|
| 4,865,368 A * | 9/1989 | McCall | ............... | E05B 65/5292 292/175 |
| 5,911,471 A * | 6/1999 | Benedict | ............... | B60N 2/3011 297/158.1 |
| 6,761,382 B2 * | 7/2004 | Ji | ........................ | E05B 15/0093 292/131 |
| D581,381 S * | 11/2008 | Vitito | ............................ | D14/132 |
| 2001/0045750 A1* | 11/2001 | Ji | ........................ | E05B 15/0093 292/131 |
| 2002/0060481 A1* | 5/2002 | Jones | ..................... | B60N 2/206 297/188.04 |
| 2002/0163215 A1* | 11/2002 | Emerling | ................... | B60N 3/102 296/24.34 |
| 2007/0182230 A1* | 8/2007 | Bhatia | .................... | B60N 3/101 297/378.1 |
| 2008/0164712 A1* | 7/2008 | Burkey | ................... | B60N 2/206 296/65.09 |
| 2018/0065513 A1* | 3/2018 | Line | ........................ | B60N 2/36 |
| 2019/0031054 A1* | 1/2019 | Line | ....................... | B60N 2/206 |

FOREIGN PATENT DOCUMENTS

| | | | | |
|---|---|---|---|---|
| FR | 2982548 A1 * | 5/2013 | ............ | B60N 3/002 |
| JP | 2001098817 A | 4/2001 | | |
| JP | 2004210260 A | 7/2004 | | |
| JP | 4148883 B2 | 9/2008 | | |
| JP | 2011214241 A | 10/2011 | | |
| JP | 5520112 B2 | 6/2014 | | |
| WO | WO-0166890 A2 * | 9/2001 | ......... | E05B 15/0093 |

* cited by examiner

LOCKING ELEMENT FOR A LID TO A STORAGE AREA IN A SEATBACK OF A VEHICLE

FIELD OF THE INVENTION

The present invention generally relates to the interior of a vehicle and, more particularly, to a lid to a storage area disposed within the interior and having a locking element.

BACKGROUND OF THE INVENTION

Vehicles sometimes have a storage area with a lid that can be opened or closed to provide selective access to the storage area. A locking element for the lid is needed, for example, to prevent undesired opening.

SUMMARY OF THE INVENTION

According to a first aspect of the present invention, a seatback for a vehicle comprises: a lid having a closed position preventing access to a storage area and an open position allowing access to the storage area; and a locking element having an engaged position that prevents the lid from transitioning from the closed position to the open position and a disengaged position that does not prevent the lid from transitioning from the closed position to the open position; wherein, the locking element transitions from the disengaged position to the engaged position via the force of gravity when the seatback transitions from a fold down position to an upright position, and transitions from the engaged position to the disengaged position when the seatback transitions from the upright position to the fold down position.

Embodiments of the first aspect of the invention can include any one or a combination of the following features:
- a forward portion and a rearward portion from the perspective of when the seatback is in the upright position;
- the lid is disposed at the rearward portion of the seatback;
- the lid is pivotally attached such that, when the seatback is in the fold down position, the lid is configured to pivot upward as the lid transitions from the closed position to the open position;
- a latch receiver;
- the lid comprises a latch that cooperates with the latch receiver as the lid transitions from the open position to the closed position to maintain the lid in the closed position;
- the latch receiver is disposed above the storage area when the seatback is in the upright position;
- the latch includes a handle portion, a cantilever portion that extends generally forward from the handle portion when the seatback is in the upright position and the lid is in the closed position, and a catch portion extending from the cantilever portion;
- the catch portion includes a catch surface that opposes the latch receiver when the lid is in the closed position and there is no pulling force on the handle portion, and an angled surface that slides against the latch receiver when the seatback is in the fold down position and the lid transitions from the open position to the closed position;
- a pulling force on the handle portion of the latch causes the catch surface not to oppose the latch receiver and, when the seatback is in the fold down position, the lid is able to transition from the closed position to the open position;
- when the lid is in the closed position, and the seatback transitions from the fold down position to the upright position, the locking element engages the latch as the locking element transitions from the disengaged position to the engaged position;
- the cantilever portion includes an aperture;
- when the lid is in the closed position, and the seatback transitions from the fold down position to the upright position, the locking element extends through the aperture as the locking element transitions from the disengaged position to the engaged position;
- the aperture of the cantilever portion is disposed between the handle portion and the catch portion;
- when the seatback is in the upright position and the lid is in the closed position, the locking element prevents the lid from transitioning to the open position in the event that the catch surface of the latch no longer opposes the latch receiver;
- the locking element includes a first end that is engaged with the lid while the locking element is in the engaged position;
- the first end projects through an aperture or into a recess of the lid while the locking element is in the engaged position;
- the locking element further includes a second end separated from the first end by a middle portion;
- as the seatback transitions from the upright position to the fold down position, the force of gravity upon the second end causes the first end to disengage from the lid;
- at least 75% of the weight of the locking element is concentrated in the second end;
- a housing that at least partially houses the locking element;
- the housing comprises an aperture through which the first end of the locking element extends when the locking element is in the engaged position, and a compartment within which the second end of the locking element can move but cannot exit, the compartment including an aperture through which the middle portion of the locking element extends;
- the compartment of the housing includes an angled wall relative to horizontal when the seatback is in the fold down position;
- the second end of the locking element slides via the force of gravity over the angled wall as the seatback transitions from the upright position to the fold down position;
- when the lid is in the closed position, and the seatback transitions from the fold down position to the upright position, the locking element transitioning from the disengaged position to the engaged position includes the first end of the locking element engaging the latch, which prevents the lid from transitioning to the open position in the event that the latch receiver no longer cooperates with the latch;
- when the lid is in the closed position, as the seatback transitions from the upright position to the fold down position, the locking element transitioning from the engaged position to the disengaged position includes the force of gravity acting upon the second end to cause the first end to disengage with the latch;
- when the lid is in the closed position, and the seatback transitions from the fold down position to the upright position, the locking element transitioning from the disengaged position to the engaged position includes the first end of the locking element extending through the locking element receiver of the latch;

when the lid is in the closed position, and the seatback transitions from the upright position to the fold down position, the locking element transitioning from the engaged position to the disengaged position includes the second end of the locking element sliding over the angled wall of the compartment of the housing, which causes the first end of the locking element to retract from the locking element receiver of the latch;

the latch is disposed at the lid and includes a handle portion, a catch portion, and a locking element receiver disposed between the handle portion and the catch portion; and when the seatback is in the upright position and the lid is in the closed position, the first end of the locking element extending into the locking element receiver of the latch prevents the lid from transitioning to the open position in the event that the catch surface of the latch no longer opposes the latch receiver.

According to a second aspect of the present invention, a vehicle seatback comprises: a storage area; a lid providing selective access to the storage area; and a locking element that is disengaged from the lid when the seatback is in a fold down position but, due to the force of gravity, engages the lid and prevents the lid from opening as the seatback transitions from the fold down position to an upright position.

According to a third aspect of the present invention, a vehicle seatback comprises: a storage area; a lid providing selective access to the storage area; and a locking element that prevents the lid from opening when the seatback is in an upright position but, due to the force of gravity, disengages from the lid to allow the lid to open when the seatback is in a fold down position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

It is to be understood that the specific devices and methods illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
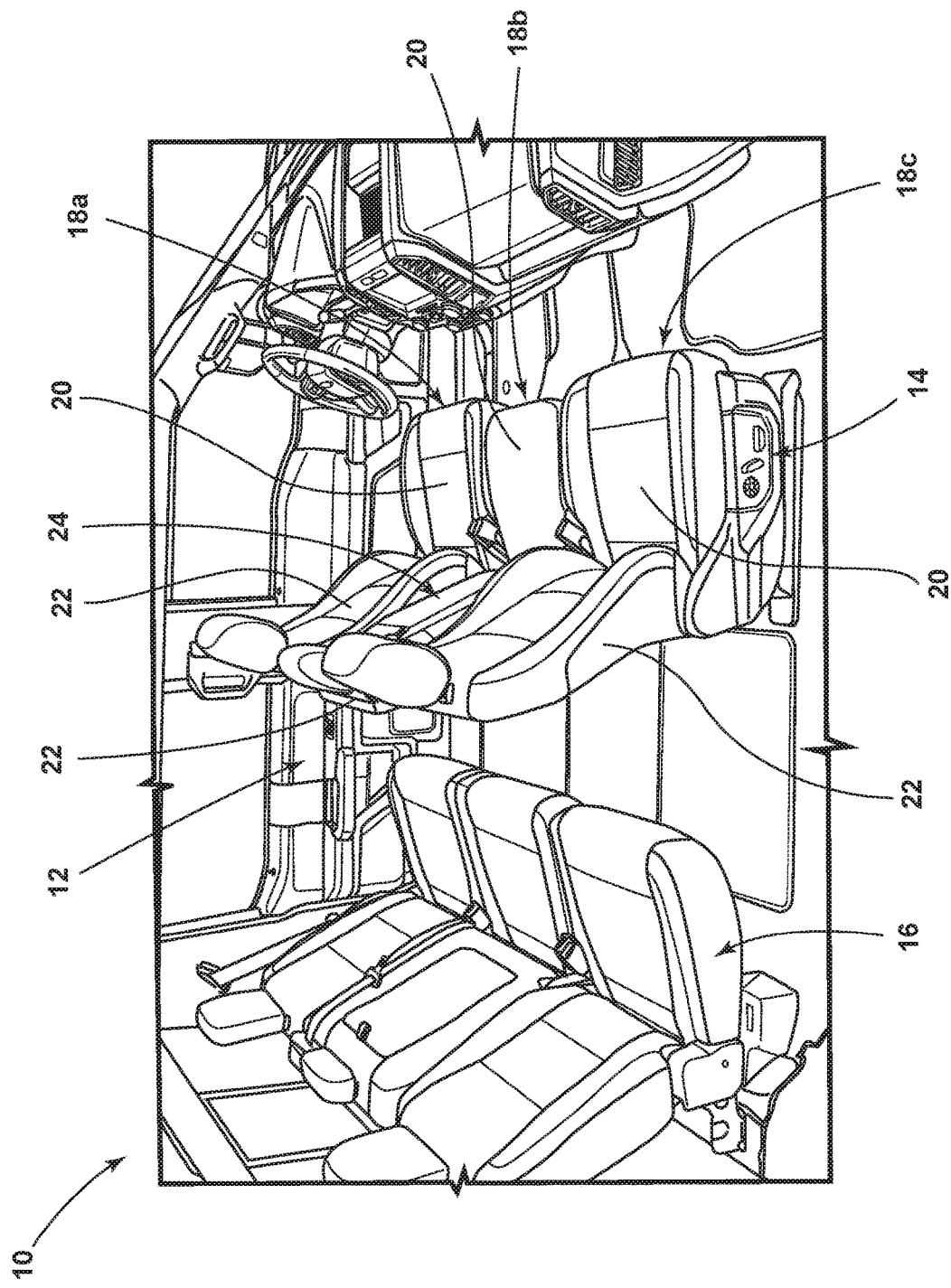
FIG. 1 is a perspective view of an interior of a vehicle illustrating a seating assembly having a seatback and a seat in a first row of seating forward a second row of seating.

For purposes of description herein, the terms "forward," "rearward," "downward," "upward," "sideways," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
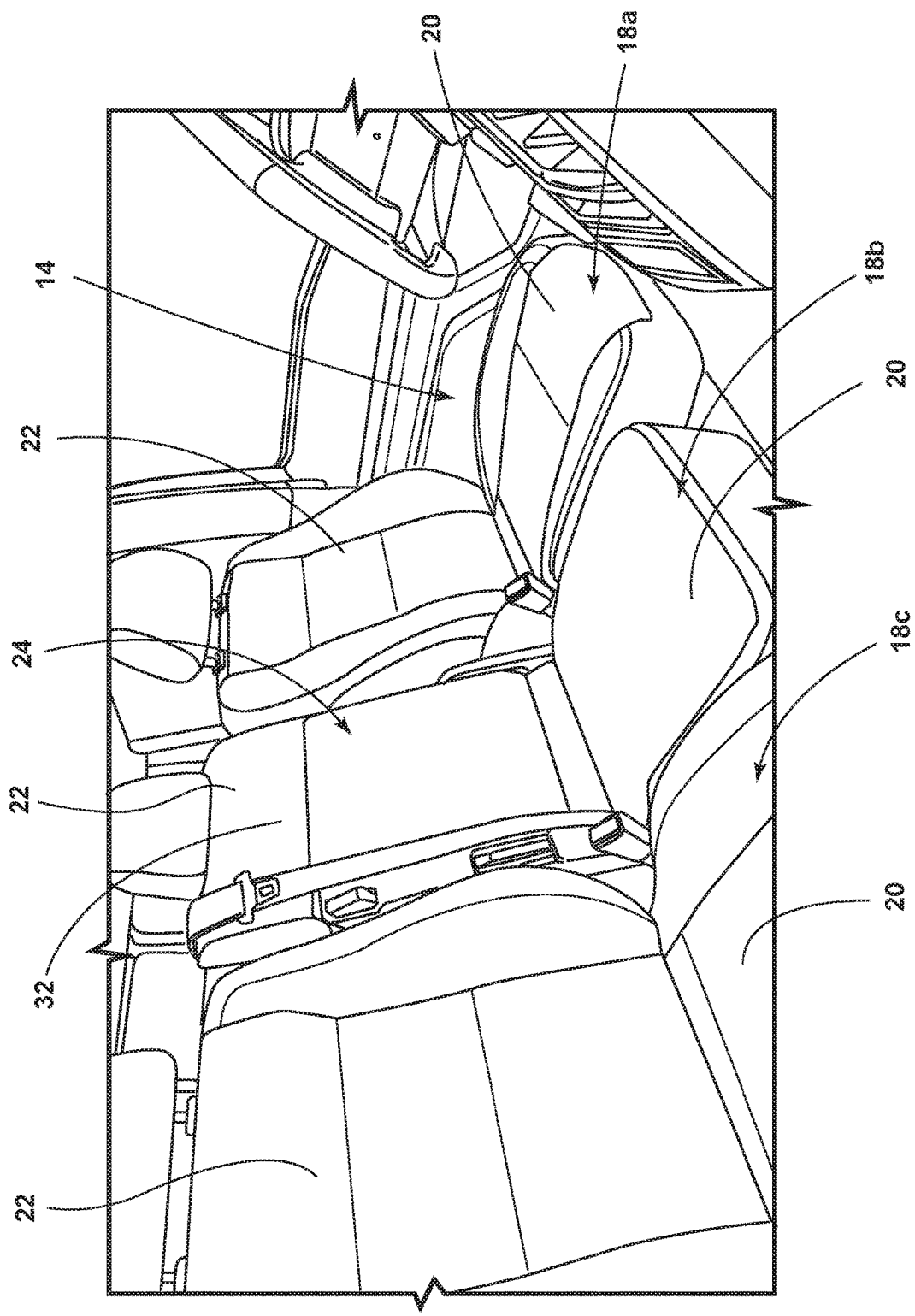
FIG. 2 is a perspective view of the seating assembly of FIG. 1, illustrating the seatback in an upright position relative to the seat.

Referring now to FIGS. 1 and 2, a vehicle 10 includes an interior 12. The vehicle 10 further includes a first row of seating 14 and optionally a second row of seating 16. The vehicle 10 can have further rows of seating. The first row of seating 14 includes several seating assemblies 18a-c, including a centrally located seating assembly 18b between two other seating assemblies 18a, 18c. The centrally located seating assembly 18b is sometimes referred to as a jump seat. Each of the seating assemblies 18a-18c includes a seat 20 and a seatback 22 configured to cooperate with the seat 20 to support an occupant (not illustrated). For example, the centrally located seating assembly 18b includes the seat 20 and seatback 22. The seatback 22 illustrated in this figure is situated in an upright position 24 relative to the seat 20. Further discussion of the seat 20 and the seatback 22 is in relation to the seat 20 and seatback 22 of seating assembly 18b.

Figure 3:
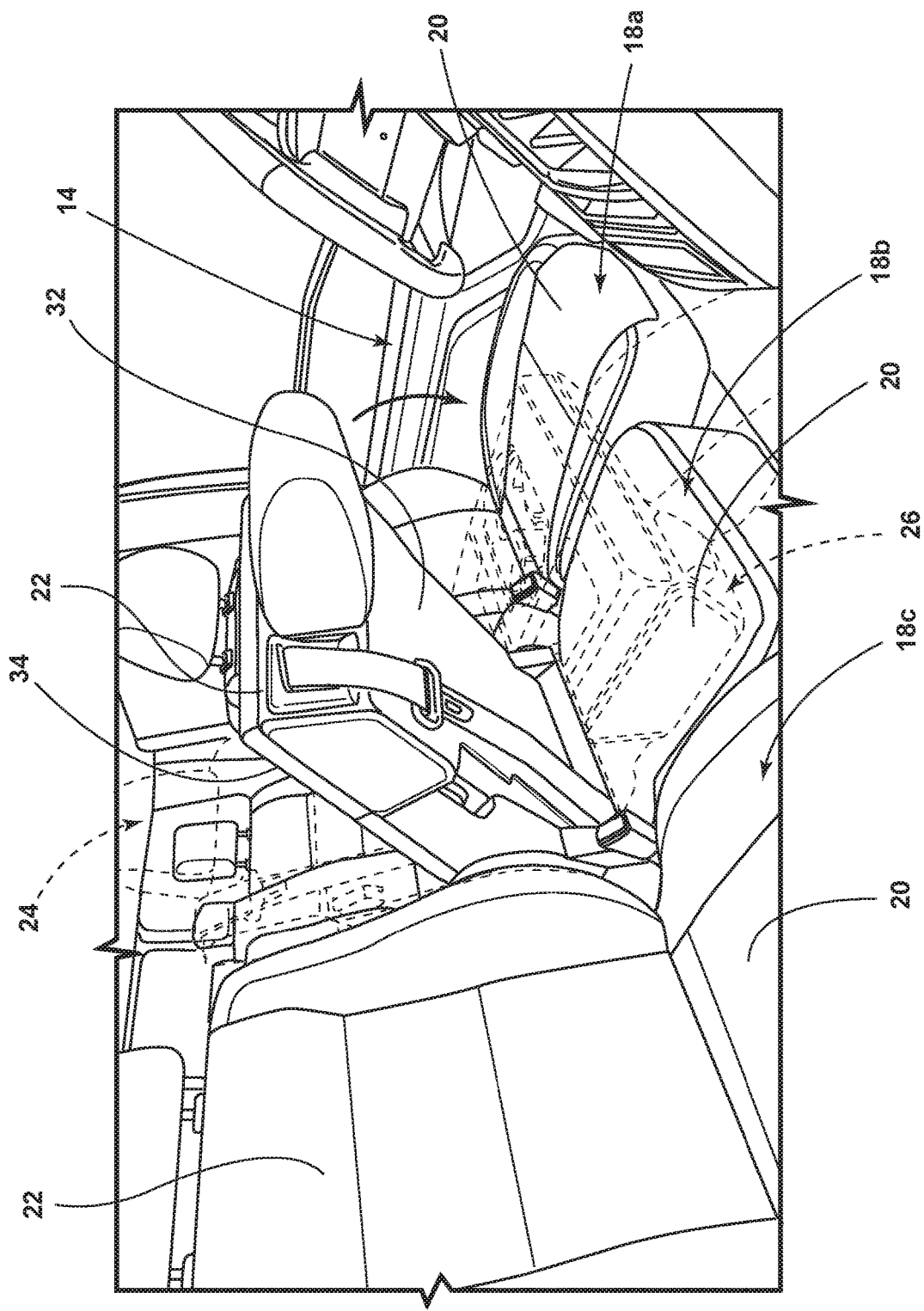
FIG. 3 is a perspective view of the seating assembly of FIG. 1, illustrating the seatback transitioning from the upright position to a fold down position over the seat.
Figure 4:
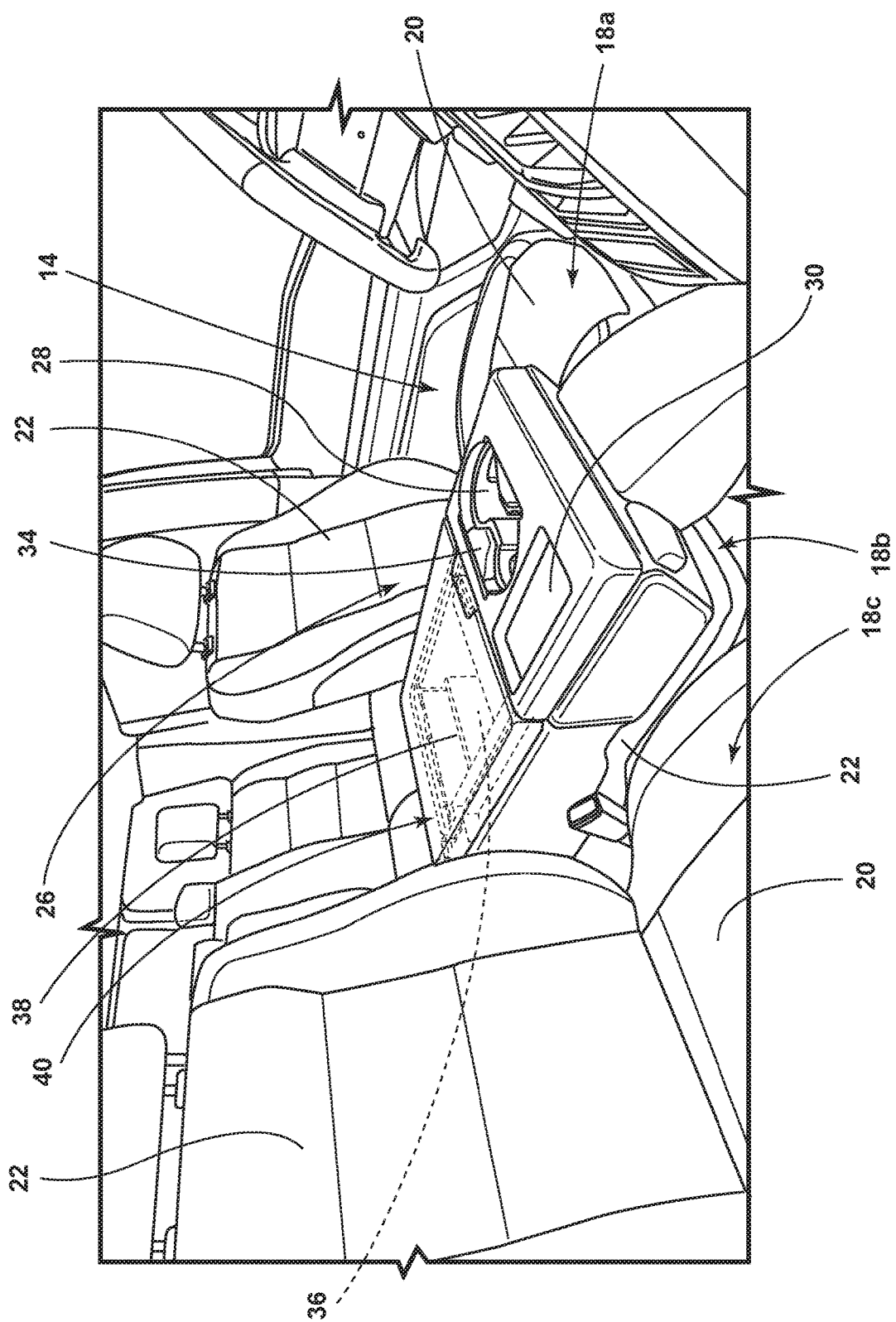
FIG. 4 is a perspective view of the seating assembly of FIG. 1, illustrating the seatback in the fold down position and a lid in a closed position concealing a storage area within the seatback.

Referring now additionally to FIGS. 3 and 4, the seatback 22 is configured to transition (FIG. 3) to, from, and between the upright position 24 (FIG. 2) and a fold down position 26 (FIG. 4). The seatback 22 as illustrated in FIG. 3 is transitioning between the upright position 24 and the fold down position 26. The seatback 22 can thus transition from the fold down position 26 (FIG. 4) to the upright position 24 (FIG. 2). In the fold down position 26, the seatback 22 of the seating assembly 18b can provide various comfort features for the occupants of the adjacent seating assemblies, such as a cup holder 28 and a tray portion 30. The seatback 22 further includes a forward portion 32 and a rearward portion 34 when the seatback 22 is in the upright position 24. In other words, from the perspective of when the seatback 22 is in the upright position 24, the forward portion 32 of the seatback 22 generally faces forward, and the rearward portion 34 of the seatback 22 generally faces rearward, such as toward the second row of seating 16. However, when the seatback 22 is in the fold down position 26, the forward portion 32 generally faces downward toward the seat 20, and the rearward portion 34 of the seatback 22 generally faces upward away from the seat 20.

Figure 5:
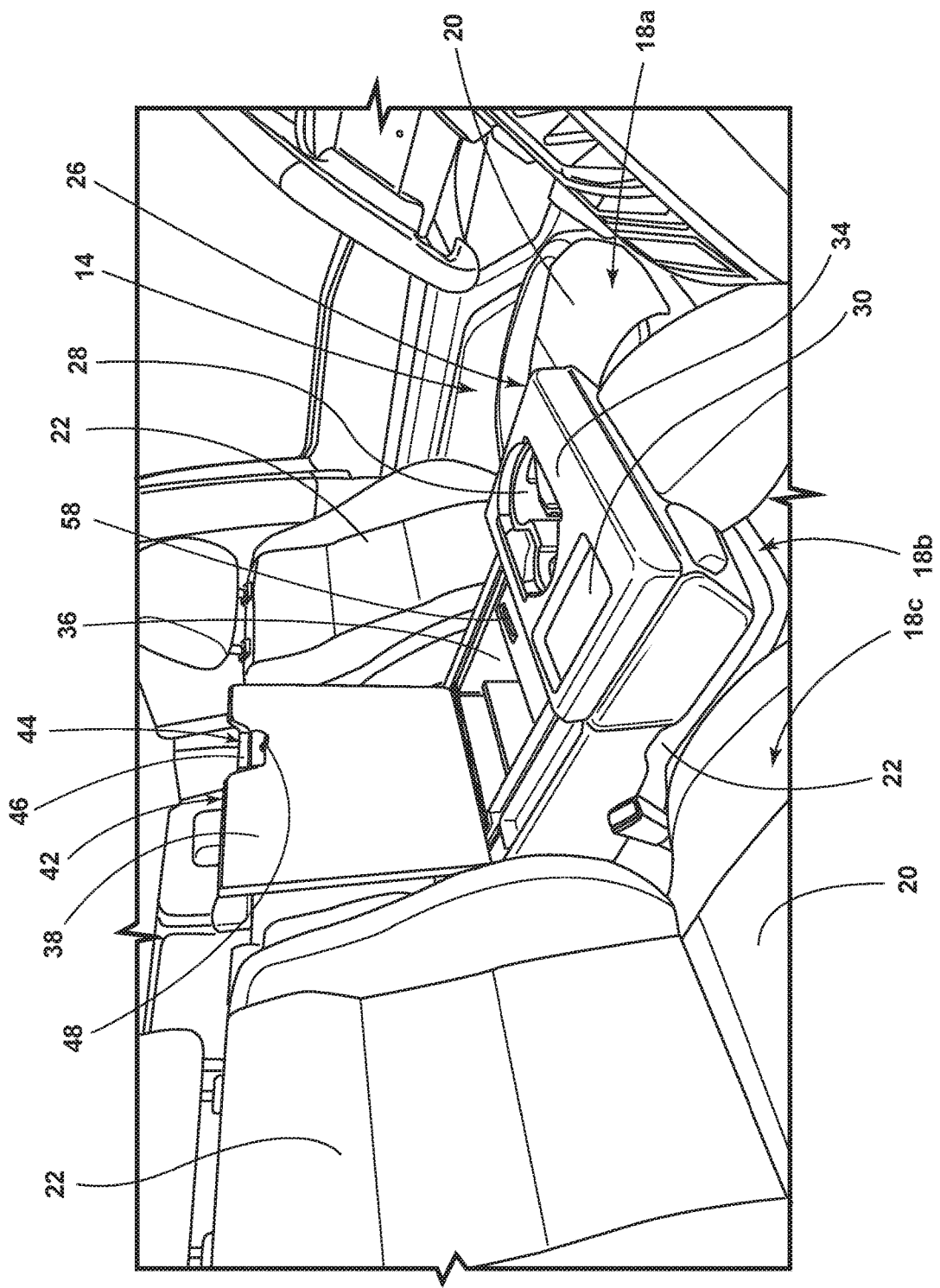
FIG. 5 is a perspective view of the seating assembly of FIG. 1, illustrating the lid in an open position revealing the storage area within the seatback and the lid having a latch.

Referring now additionally to FIG. 5, the seatback 22 further includes a storage area 36. The storage area 36 is a recess into the seatback 22 configured to accept one or more items (not illustrated) for storage. The seatback 22 further includes a lid 38 to provide selective access to the storage area 36. The lid 38 is disposed at the rearward portion 34 of the seatback 22. For example, the lid 38 has a closed position 40 (FIG. 4), which prevents access to the storage area 36. In the closed position 40, an occupant of the vehicle 10 cannot insert an item into, or remove an item from, the storage area 36. The lid 38 further has an open position 42 (FIG. 5), which allows access to the storage area 36. In the open position 42, an occupant of the vehicle 10 can insert an item into, and remove an item from, the storage area 36. In the illustrated embodiment, the lid 38 is pivotally attached at the rearward portion 34 of the seatback 22. Thus, when the seatback 22 is in the fold down position 26, the lid 38 is configured to, and does, pivot upward in the general direction away from the seat 20 as the lid 38 transitions from the closed position 40 to the open position 42. However, the lid 38 can be attached in ways other than pivotally attached and still provide selective access to the storage area 36. For example, the lid 38 can be a detachable piece or a piece that slides open to reveal the storage area 36.

Figure 6:
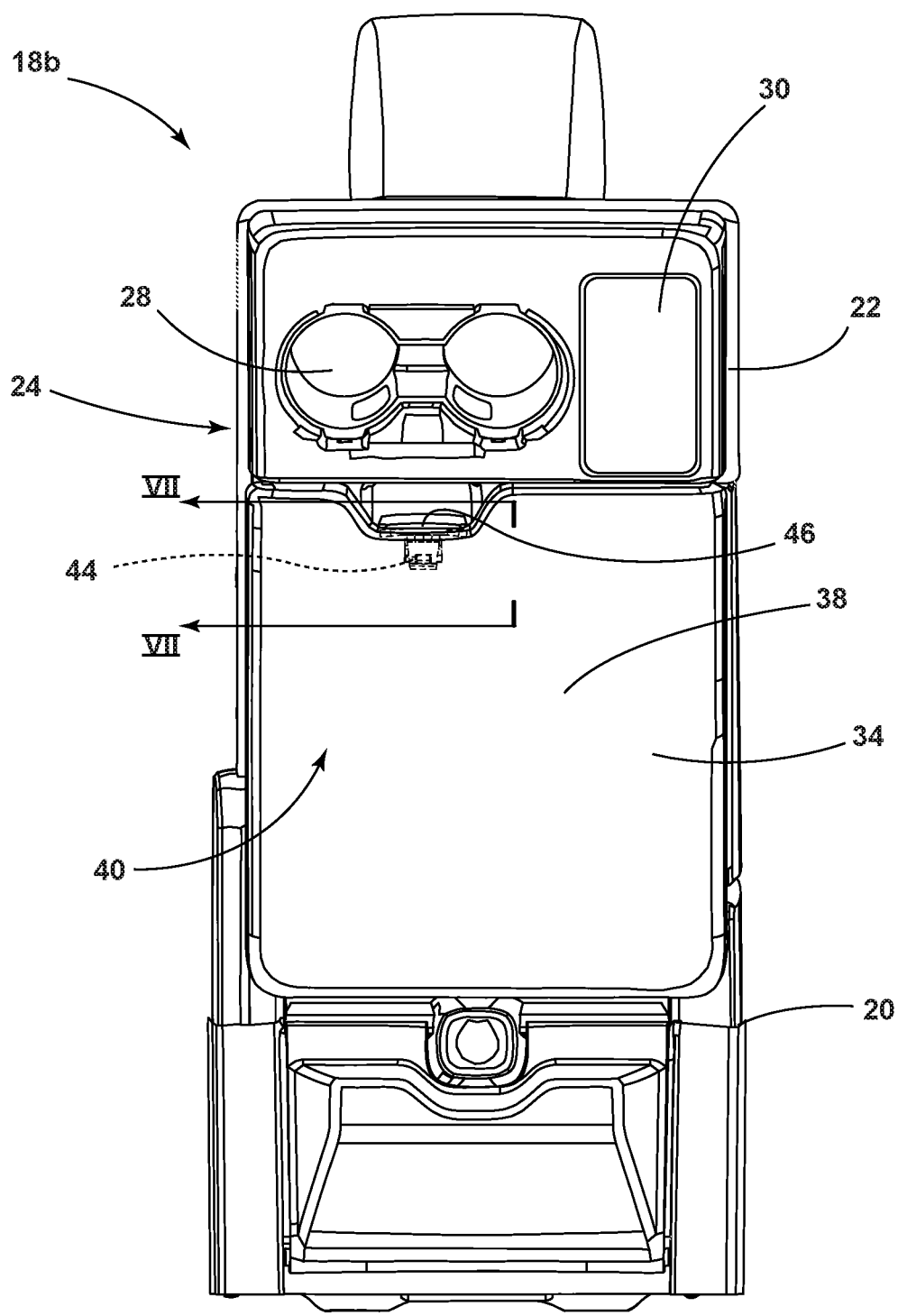
FIG. 6 is a rear view of the seating assembly of FIG. 1, illustrating the seatback in the upright position and the lid in the closed position.
Figure 7:
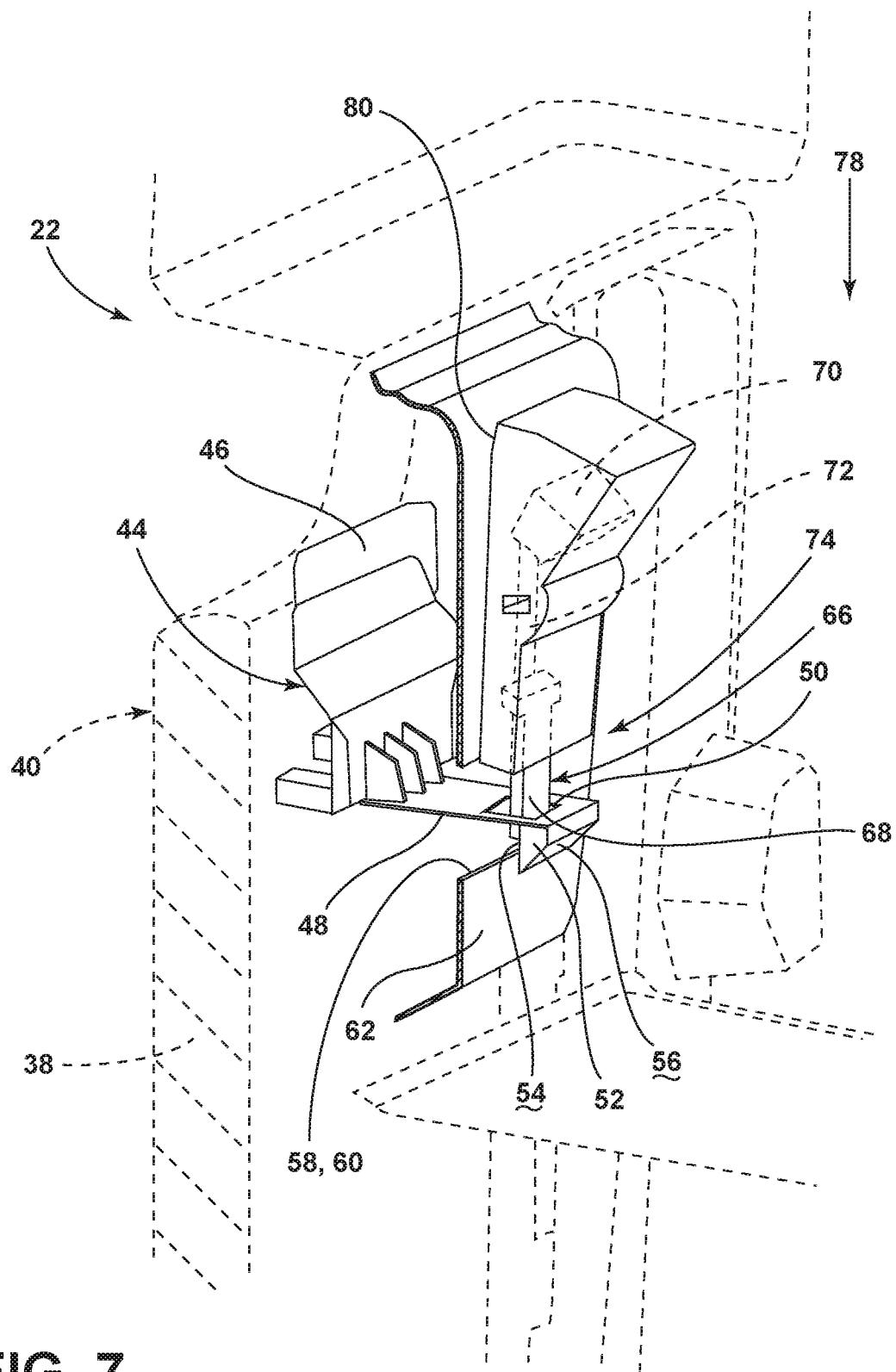
FIG. 7 is a perspective side view of the cross-section taken along line VII-VII of FIG. 6, illustrating a cantilever portion of the latch of the lid extending through a latch receiver and cooperating with a locking element in an engaged position to prevent the seatback from moving from the closed position to the open position while the seatback is in the upright position.
Figure 8:
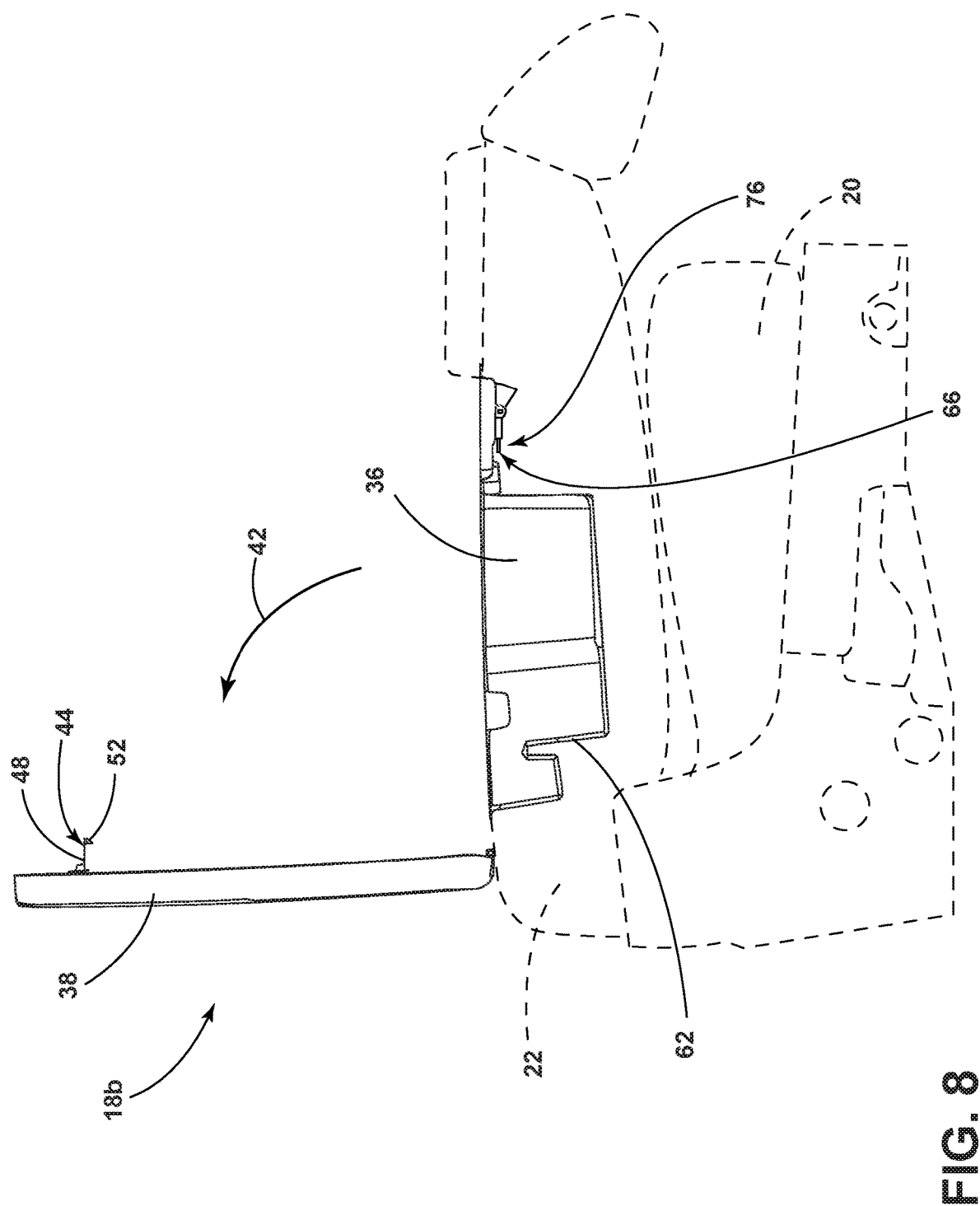
FIG. 8 is a side view of the seating assembly of FIG. 1, illustrating the seatback in the fold down position and the locking element in a disengaged position allowing the lid to be in the open position.

Referring now additionally to FIGS. 6-8, the lid 38 of the illustrated embodiment further comprises a latch 44. The latch 44 includes a handle portion 46. As further discussed below, an occupant of the vehicle 10 can use a hand (not illustrated) to manipulate the handle portion 46 of the latch 44 to transition the lid 38 from the closed position 40 to the open position 42, while the seatback 22 is in the fold down position 26. The latch 44 further includes a cantilever portion 48. The cantilever portion 48 extends away from the handle portion 46, and thus manipulation of the handle portion 46 causes the cantilever portion 48 to move. The cantilever portion 48 extends generally forward (including generally forward from the handle portion 46) when the seatback 22 is in the upright position 24 and the lid 38 is in the closed position 40. The cantilever portion 48 includes an aperture 50 (see FIG. 7), the purpose of which is discussed below. The lid 38 further includes a catch portion 52. The aperture 50 is disposed between the handle portion 46 and the catch portion 52. The catch portion 52 extends from the cantilever portion 48, such as extending downward from the cantilever portion 48 when the seatback 22 is in the upright position 24 and the lid 38 is in the closed position 40. The catch portion 52 includes a catch surface 54 and an angled surface 56. The catch surface 54 faces generally rearward when the seatback 22 is in the upright position 24 and the lid 38 is in the closed position 40. The angled surface 56 faces generally forward and downward when the seatback 22 is in the upright position 24 and the lid 38 is in the closed position 40.

The seatback 22 further includes a latch receiver 58. The latch 44 cooperates with the latch receiver 58 as the lid 38 transitions from the open position 42 to the closed position 40 to maintain the lid 38 in the closed position 40. The latch receiver 58 can be an aperture 60. The aperture 60 can be disposed through a molded plastic piece 62 that forms the storage area 36. The latch receiver 58 in the illustrated embodiment is disposed above the storage area 36 when the seatback 22 is in the upright position 24. The catch surface 54 of the catch portion 52 of the latch 44 opposes the latch receiver 58 when the lid 38 is in the closed position 40 and there is no pulling force on the handle portion 46 (that is, there is no manipulation of the handle portion 46 causing the catch portion 52 to also move).

Figure 9:
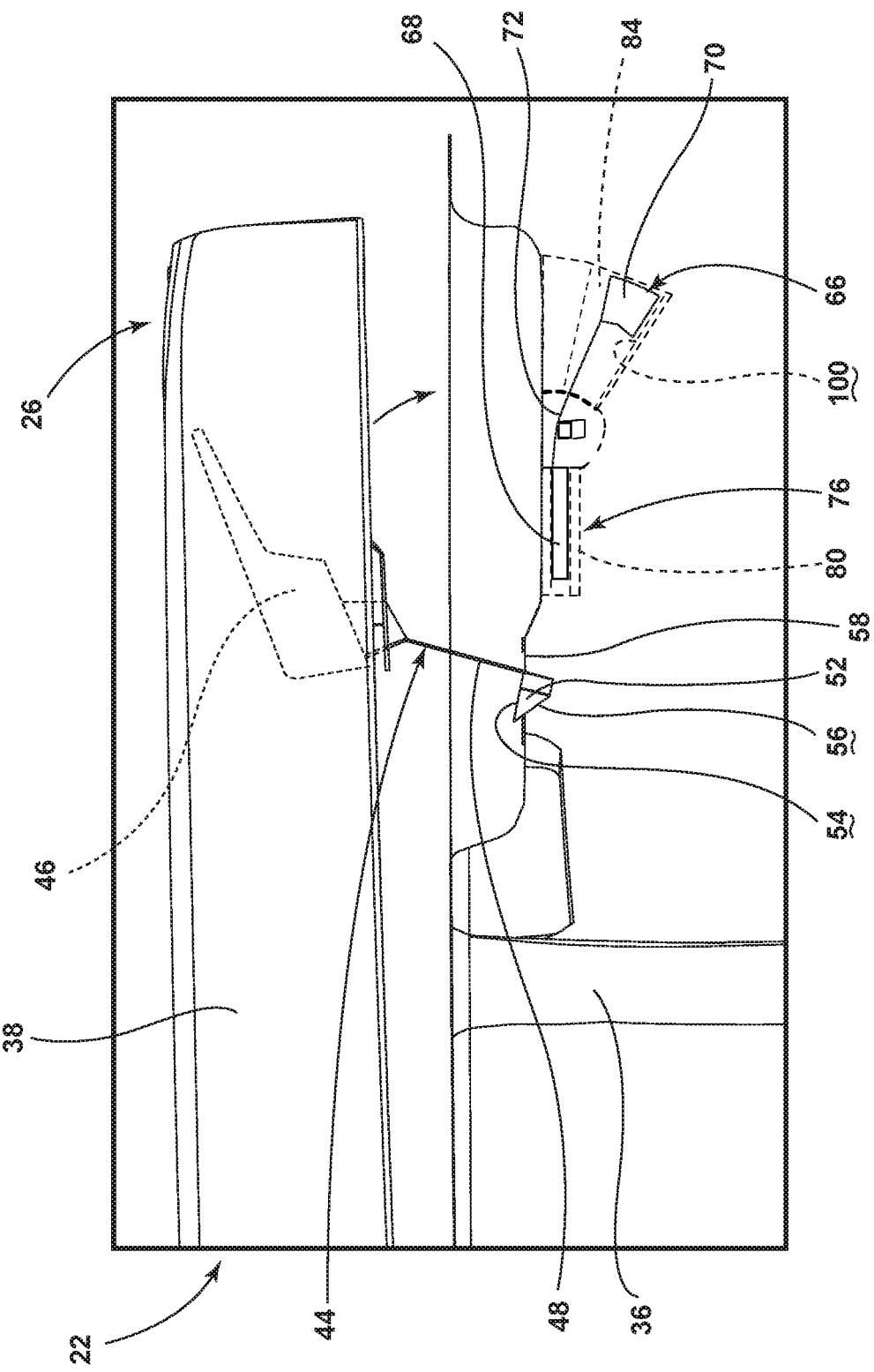
FIG. 9 is a side close up view of the seating assembly of FIG. 1, illustrating the lid transitioning to the closed position with the latch receiver deforming the latch of the lid as an angled surface of a catch portion of the latch slides over the latch receiver.
Figure 10:
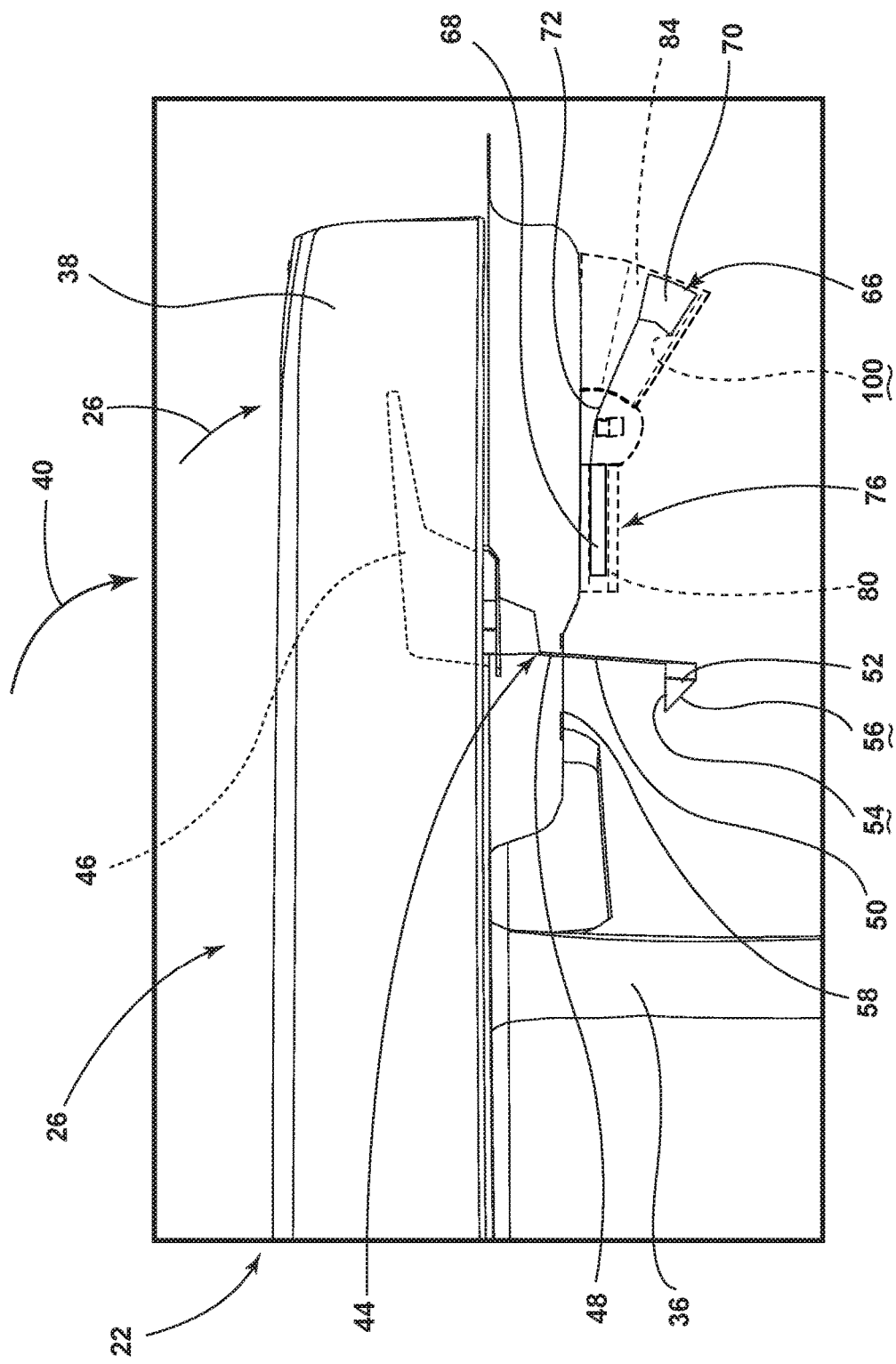
FIG. 10 is a side close up view of the seating assembly of FIG. 1, illustrating the lid having transitioned to the closed position with a catch surface of the catch portion of the latch opposing the latch receiver, but with the locking element still in the disengaged position because the seatback is in the fold down position.
Figure 11:
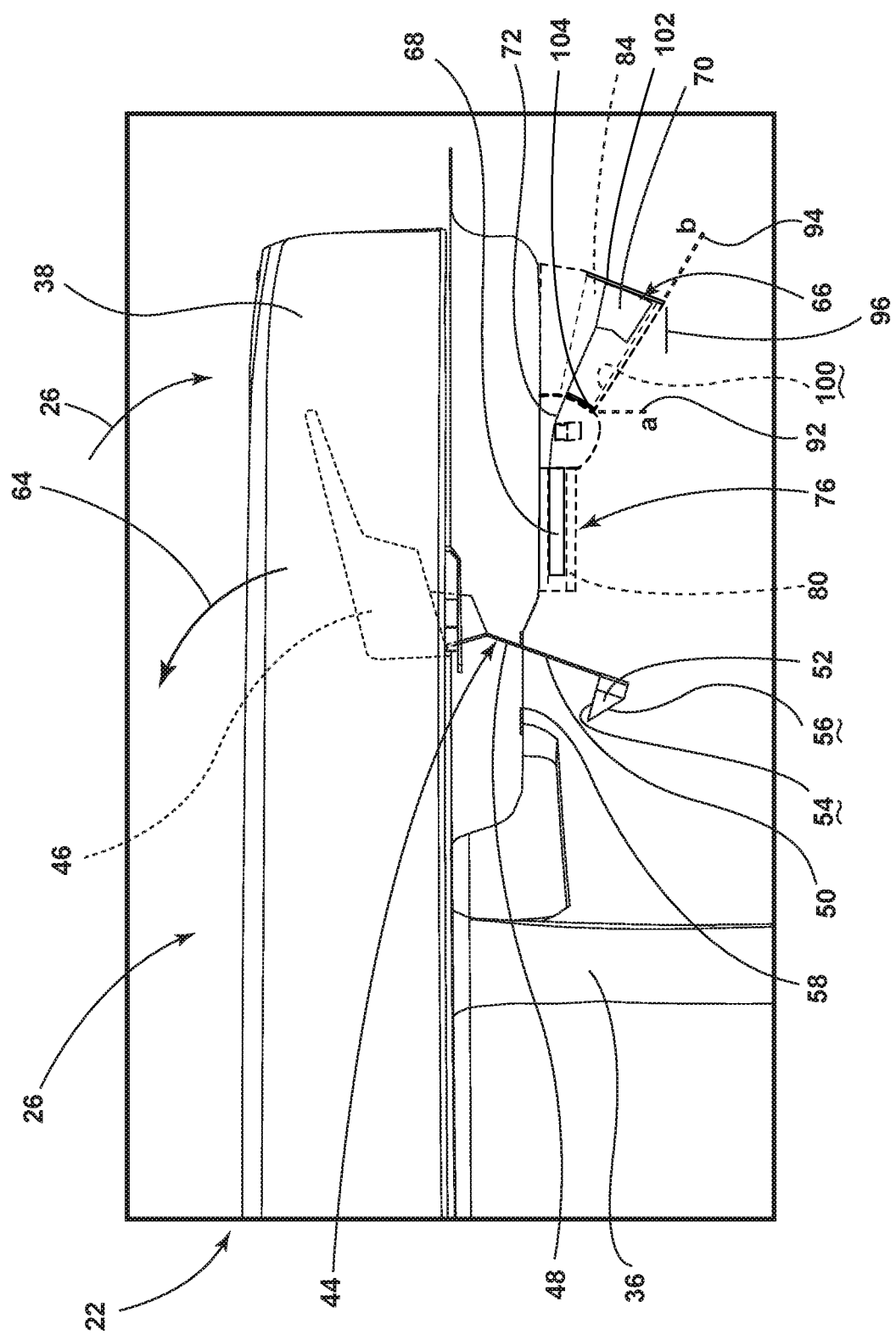
FIG. 11 is a side close up view of the seating assembly of FIG. 1, illustrating a pulling force applied to a handle portion of the latch of the lid and the pulling force causing the catch portion of the latch to no longer oppose the latch receiver thus allowing the lid to move to the open position.

Referring now additionally to FIGS. 9 and 10, when the seatback 22 is in the fold down position 26, as the lid 38 transitions (FIG. 9) from the open position 42 (FIG. 8) to the closed position 40 (FIG. 10) and no pulling force 64 (see FIG. 11) is applied on the handle portion 46, the angled surface 56 slides against the latch receiver 58, which forces the latch 44 to rotate (as if a pulling force 64 was being applied to the handle portion 46). Eventually, the angled surface 56 passes the latch receiver 58, the latch 44 unrotates (to the state as in FIG. 10—the latch 44 can be biased to this position), and the catch surface 54 opposes the latch receiver 58. As mentioned, without the pulling force 64 on the handle portion 46, the catch surface 54 opposing the latch receiver 58 will resist the lid 38 attempting to move from the closed position 40 to the open position 42. As illustrated in FIG. 11, the pulling force 64 on the handle portion 46 of the latch 44 also moves the catch portion 52 and causes the catch surface 54 not to oppose the latch receiver 58. Thus, when the seatback 22 is in the fold down position 26, the lid 38 can be opened, i.e., the lid 38 can transition from the closed position 40 to the open position 42.

Referring back to FIG. 7, for example, the seatback 22 further includes a locking element 66. The locking element 66 has a first end 68 and a second end 70, which is separated from the first end 68 by a middle portion 72. The locking element 66 has both an engaged position 74 (FIG. 7) and a disengaged position 76 (FIGS. 8-11). In the engaged position 74, if the lid 38 is in the closed position 40, the locking element 66 prevents the lid 38 from transitioning from the closed position 40 to the open position 42. As explained above, the latch 44 of the lid 38 cooperates with the latch receiver 58 while the lid 38 is in the closed position 40 to maintain the lid 38 in the closed position 40 in the absence of the pulling force 64 applied to the handle portion 46 of the latch 44. However, without the locking element 66, if the seatback 22 were in the upright position 24 and an occupant (not illustrated) of the second row of seating 16 applied the pulling force 64 to the handle portion 46 of the latch 44, the lid 38 would transition to the open position 42 and expose the storage area 36, allowing any contents of the storage area 36 to fall out. In addition, the cooperation between the latch 44 and the latch receiver 58 may not be sufficiently strong to maintain the lid 38 in the closed position 40 when the seatback 22 is in the upright position 24 and the seatback 22 is jolted, such as when the vehicle 10 is impacted by an external object (not illustrated, e.g., another vehicle impacting the vehicle 10 at the side of the vehicle 10).

In the disengaged position 76, the locking element 66 does not prevent the lid 38 from transitioning from the closed position 40 to the open position 42. While the locking element 66 is in the disengaged position 76, only the cooperation between the latch 44 of the lid 38 and the latch receiver 58, which can be nullified with the pulling force 64 to the handle portion 46, maintains the lid 38 in the closed position 40. In other words, when the locking element 66 is in the disengaged position 76 and the seatback 22 is in the fold down position 26, the lid 38 is able to transition from the closed position 40 to the open position 42 when a pulling force 64 on the handle portion 46 of the latch 44 causes the catch surface 54 not to oppose the latch receiver 58.

Figure 12:
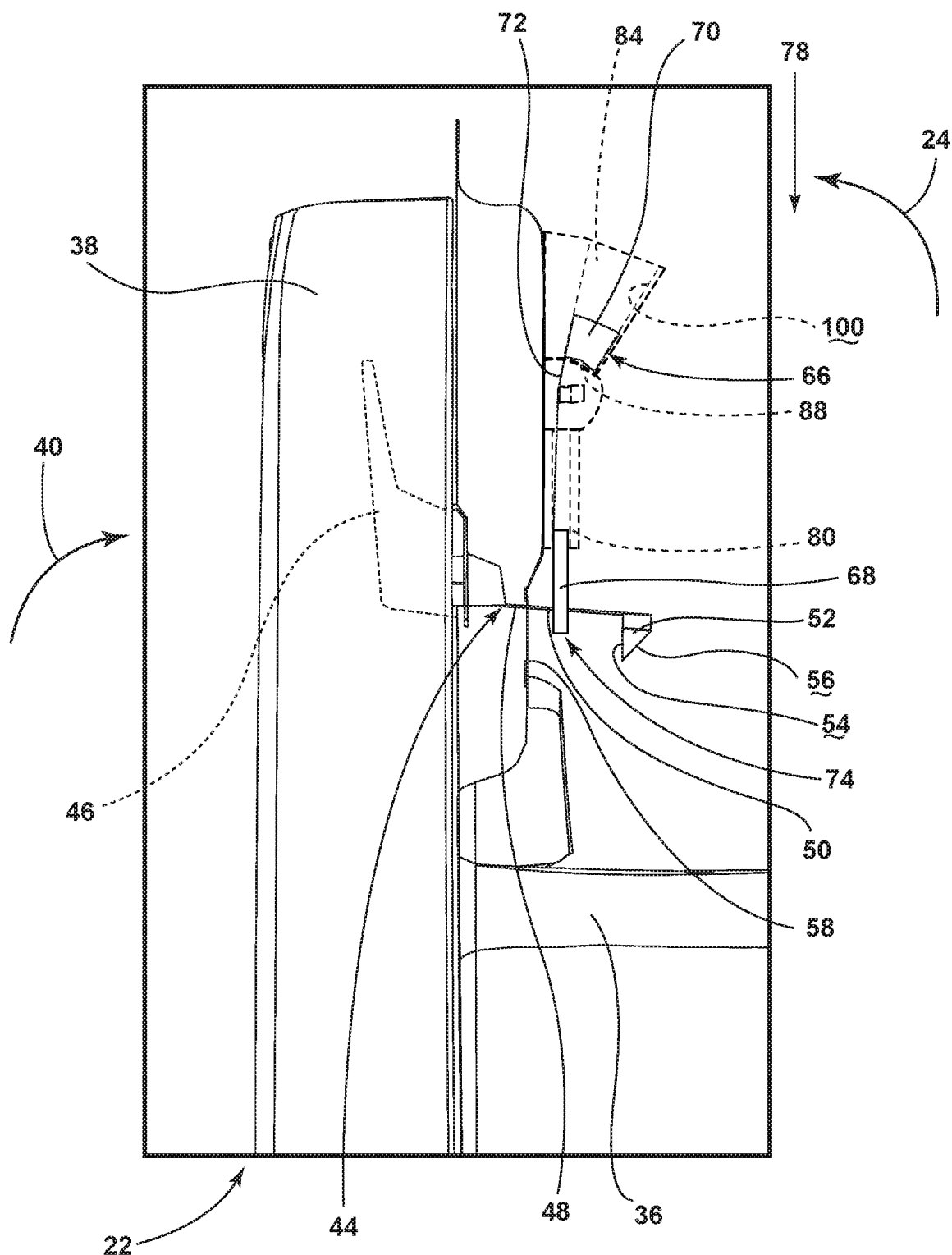
FIG. 12 is a side close up view of the seating assembly of FIG. 1, illustrating the seatback in the upright position with the lid in the closed position and the locking element in an engaged position with a first end of the locking element extending through an aperture of the cantilever portion of the latch of the lid.
Figure 13:
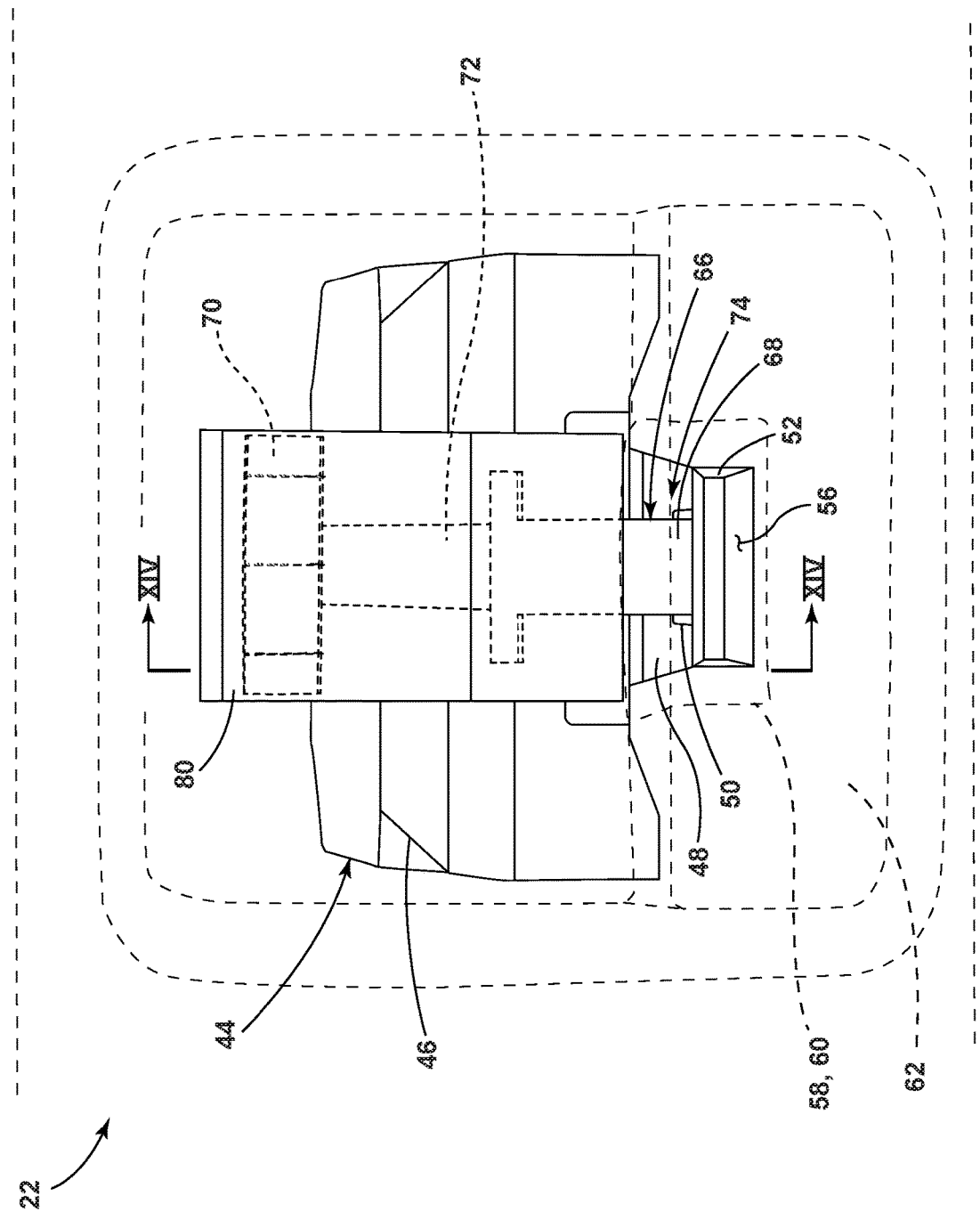
FIG. 13 is a perspective overhead view of the seatback of FIG. 1, illustrating the locking element in the engaged position with the latch with the first end of the locking element extending through the aperture of the cantilever portion of the latch of the lid, with the aperture of the cantilever disposed between the handle portion and the catch portion of the latch.
Figure 14:
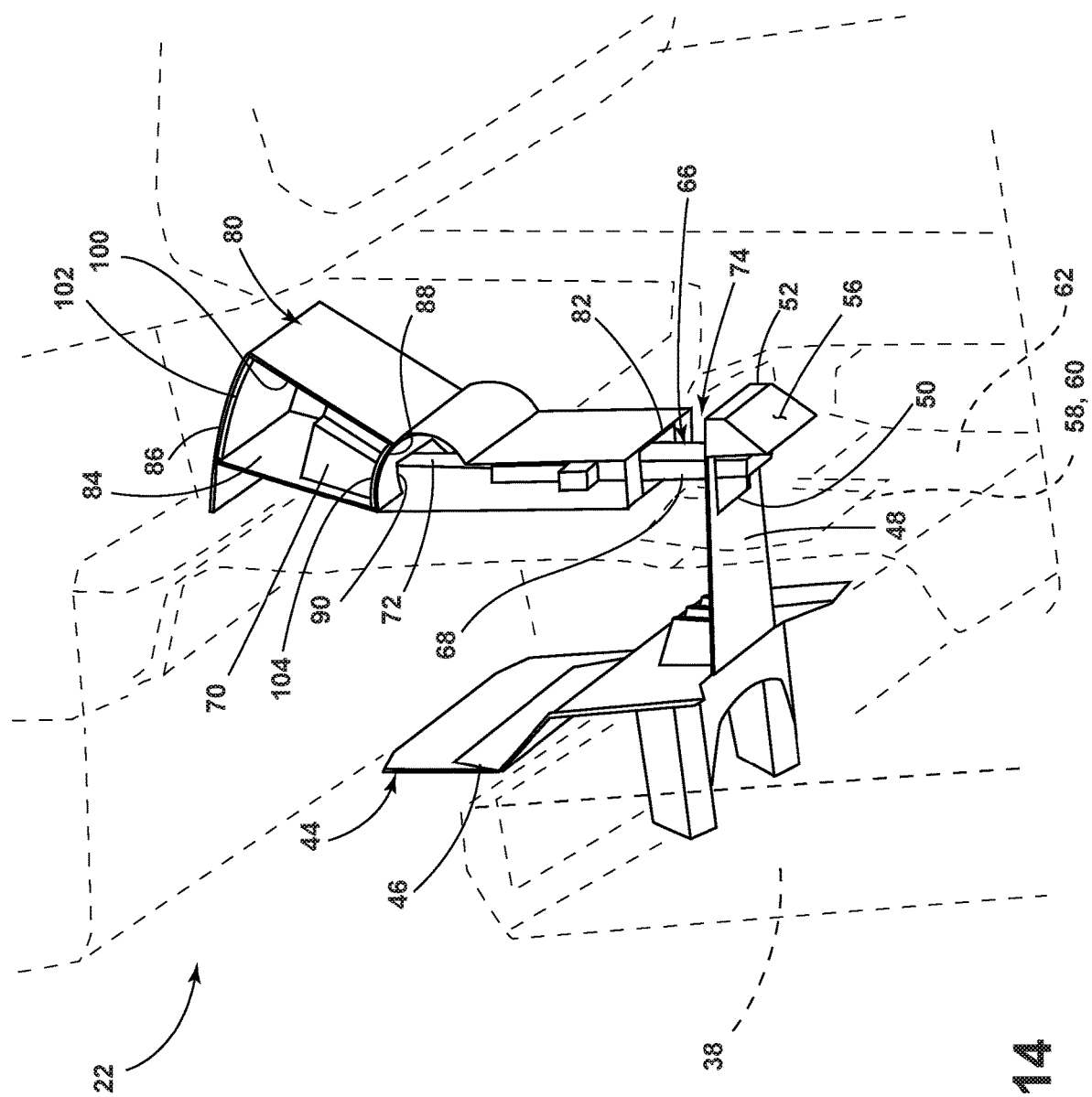
FIG. 14 is a perspective side view of the seatback of FIG. 1 of the cross section taken along line XIV-XIV of FIG. 13, illustrating a housing within which the locking element can move as the seatback transitions to, from, and between the upright position and the fold down position, including an aperture through which the first end of the locking element extends when the locking element is in the engaged position and a compartment for a second end of the locking element.
Figure 15:
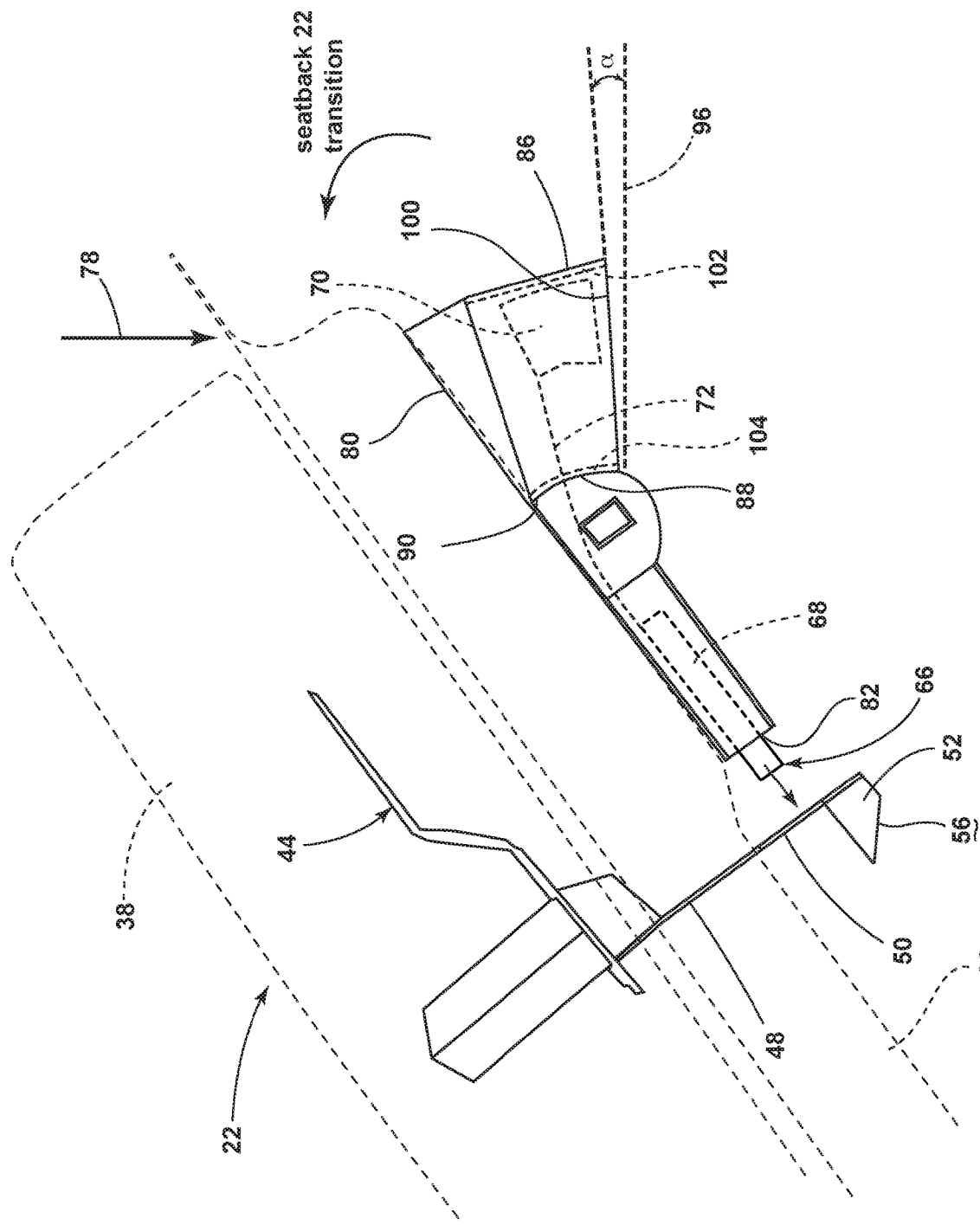
FIG. 15 is a side view of the seatback of FIG. 1, illustrating the seatback transitioning from the fold down position toward the upright position, and an angled wall of the compartment of the housing for the second end has surpassed horizontal and the force of gravity causes the second end to move toward a wall of the compartment, which causes the first end to move towards the aperture of the cantilever portion of the latch.
Figure 16:
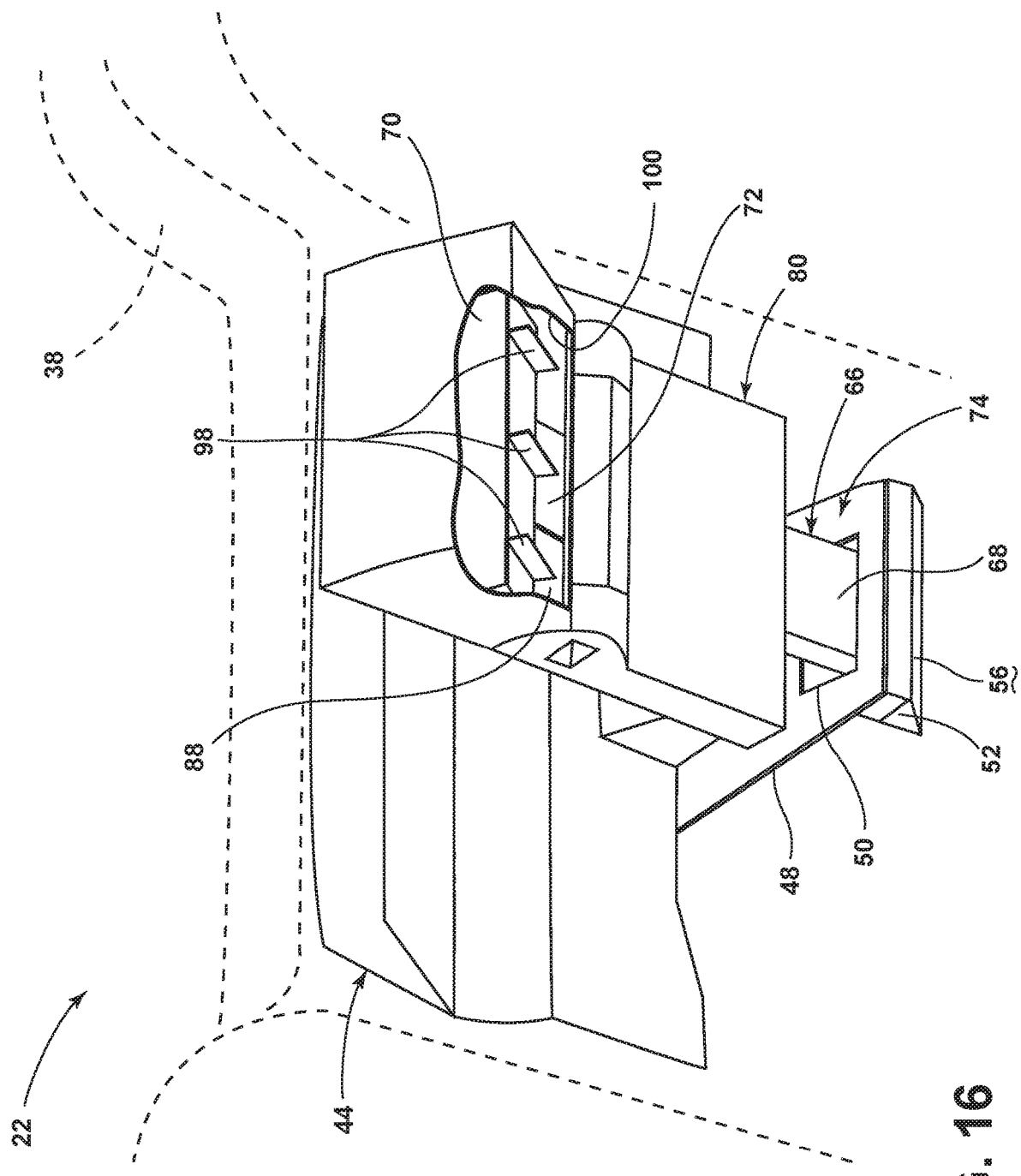
FIG. 16 is an overhead perspective view of the seatback of FIG. 1, illustrating ridges of the second end of the locking element to reduce the friction between the second end and the angled wall over which the second end slides due to the force of gravity as the seatback transitions to, from, and between the upright positon and the fold down position.
Figure 17:
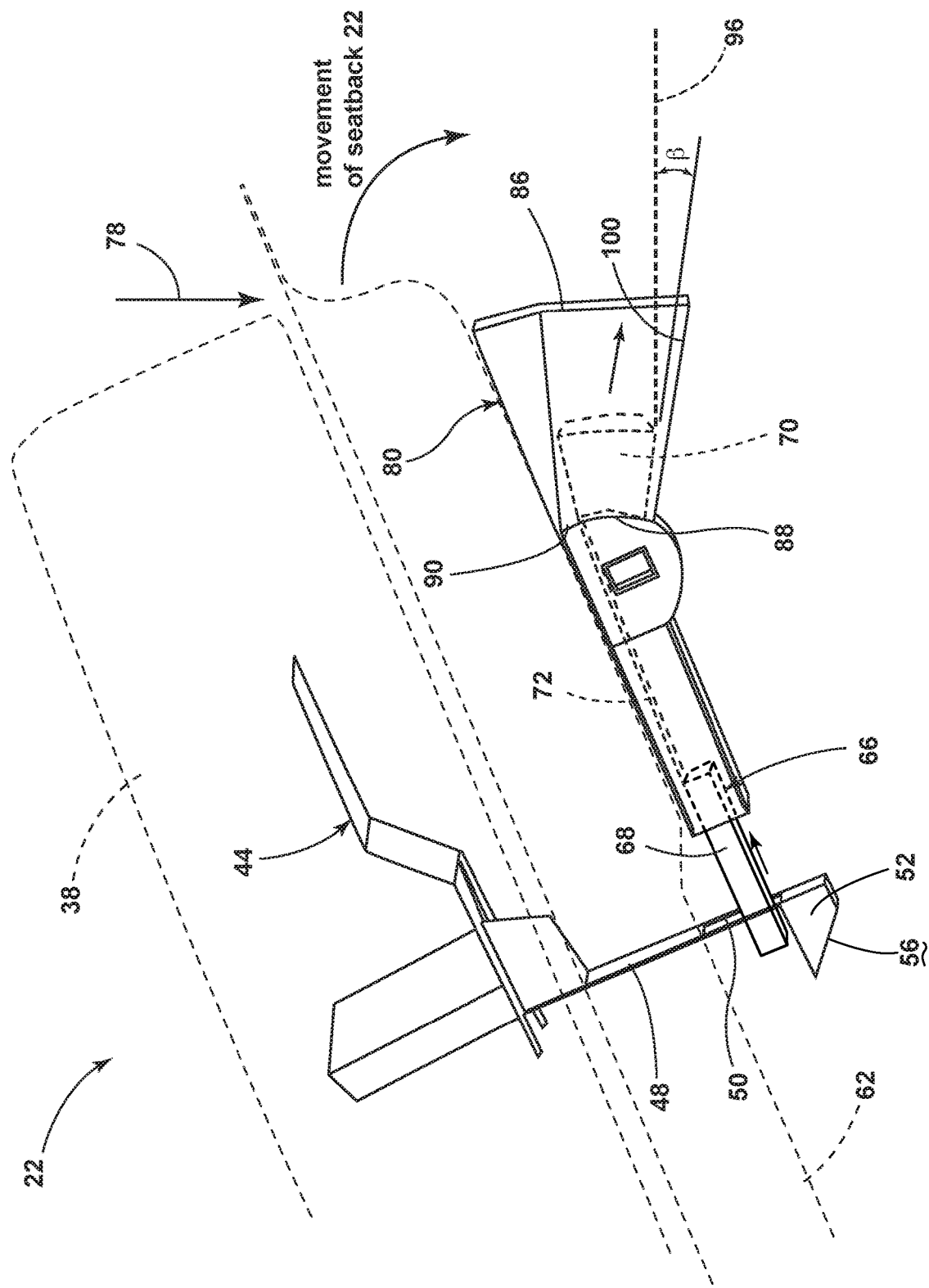
FIG. 17 is a side view of the seatback of FIG. 1, illustrating the seatback transition from the upright position toward the fold down position, and the angled wall of the compartment of the housing for the second end has surpassed horizontal and the force of gravity causes the second end to move toward another wall of the compartment, which causes the first end to retract from the aperture of the cantilever portion of the latch.

Referring now additionally to FIG. 12, the locking element 66 transitions from the disengaged position 76 (see, e.g., FIG. 11) to the engaged position 74 (see, e.g., FIG. 12) via a force of gravity 78 when the seatback 22 transitions from the fold down position 26 (FIG. 11) to the upright position 24 (FIG. 12). In other words, when the lid 38 is in the closed position 40 (as in FIG. 12), and the seatback 22 transitions from the fold down position 26 (as in FIG. 11) to the upright position 24 (as in FIG. 12), the locking element 66 engages the latch 44 as the locking element 66 transitions from the disengaged position 76 (as in FIG. 11) to the engaged position 74 (as in FIG. 12). For example, in the illustrated embodiment, when the lid 38 is in the closed position 40, and the seatback 22 transitions from the fold down position 26 to the upright position 24, the first end 68 of the locking element 66 extends through the locking element receiver 50 (here, the aperture 50) of the cantilever portion 48 of the latch 44 as the locking element 66 transitions from the disengaged position 76 to the engaged position 74. The aperture 50 of the cantilever portion 48 of the latch 44 acts as a locking element receiver 50, which in this embodiment is disposed between the handle portion 46 and the catch portion 52. The first end 68 of the locking element 66 is engaged with the lid 38 while the locking element 66 is in the engaged position 74 by projecting through the aperture 50 of the cantilever portion 48 of the latch 44 of the lid 38. In other embodiments of the lid 38, the first end 68 might extend/project into a recess or some other aperture (not illustrated) of the lid 38 while the locking element 66 is in the engaged position 74 to secure the lid 38 in the closed position 40 while the seatback 22 is in the upright position 24. When the seatback 22 is in the upright position 24 and the lid 38 is in the closed position 40, the locking element 66 prevents the lid 38 from transitioning to the open position 42 in the event that the catch surface 54 of the latch 44 no longer opposes the latch receiver 58 (that is, the latch receiver 58 and the latch 44 no longer cooperate). In the event that the lid 38 attempted to move toward the open position 42, without the locking element 66, the catch portion 52 of the latch 44 might deflect upward (from the perspective of FIG. 12) over the latch receiver 58 allowing the lid 38 to move to the open position 42. However, with the locking element 66 extended through the aperture 50 of the latch 44, the catch portion 52 would not deflect upwards and even it if did, the catch portion 52 could never extend over the locking element 66 and thus, the lid 38 could never move to the open position 42 (without the latch 44 breaking). Downward deflection of the catch portion 52, so as to extend under the locking element 66, would only cause the catch portion 52 to oppose the latch receiver 58 more strongly, thus preventing the lid 38 from moving to the open position 42. The locking element 66 extending through the aperture 50 of the cantilever portion 48 of the latch 44 precludes sideways (i.e., lateral) deformation of the latch 44 and thus prevents the lid 38 from moving to the open position 42.

Referring again additionally back to FIG. 7, and additionally to FIGS. 13-17, the seatback 22 further includes a housing 80 that at least partially houses the locking element 66. The housing 80 limits the possible movements of the locking element 66 and facilitates how the force of gravity 78 manipulates the locking element 66. In the illustrated embodiment, the housing 80 includes an aperture 82 (see FIG. 14) through which the first end 68 of the locking element 66 extends at least when the locking element 66 is in the engaged position 74. The housing 80 further includes a compartment 84 within which the second end 70 of the locking element 66 can move but cannot exit. The compartment 84 can, for example, include opposing walls 86, 88. The compartment 84 includes an aperture 90 through which the middle portion 72 of the locking element 66 extends. The compartment 84 further includes an angled wall 100 (relative to horizontal 96) when the seatback 22 is in the fold down position 26 (e.g., FIG. 11). The angled wall 100 is angled downward from point "a" 92 to point "b" 94 relative to horizontal 96. The housing 80 can further include pads 102 and 104, applied over the walls 86 and 88 respectively to prevent the second end 70 from generating the noise that the second end 70 would make upon interacting with the walls 86 and 88.

In the illustrated embodiment, as the seatback 22 transitions (see FIG. 15) from the fold down position 26 to the upright position 24, the angled wall 100 becomes level with horizontal 96 and then surpasses horizontal 96 (such as forming angle α relative to horizontal 96). The force of gravity 78 then causes the second end 70 of the locking element 66 to slide against the angled wall 100 in the general direction toward the wall 88 and away from the opposing wall 86. The second end 70 can include several ridges 98 (see FIG. 16) to reduce the friction between the second end 70 and the angled wall 100. The movement of the second end 70 also moves the first end 68 toward and eventually through the aperture 50 of the cantilever portion 48 of the latch 44 of the lid 38, at which point the locking element 66 has transitioned to the engaged position 74. By the time, or when, the seatback 22 transitions to the upright position 24, the force of gravity 78 has caused the second end 70 to move adjacent to the wall 88 (with the pad 104 separating the second end 70 from the wall 88) and the first end 68 to extend through the aperture 50 of the latch 44 and thus the locking element 66 to the engaged position 74.

In the opposite scenario—the transition (see FIG. 17) of the seatback 22 from the upright position 24 to the fold down position 26—the locking element 66 transitions, via the force of gravity 78, from the engaged position 74 (see, e.g., FIG. 12) to the disengaged position 76 (see, e.g., FIG. 10). As the seatback 22 transitions from the upright position 24 to the fold down position 26, the angled wall 100 becomes level with horizontal 96 and then surpasses horizontal 96 (such as forming angle β relative to horizontal 96). The force of gravity 78 then causes the second end 70 of the locking element 66 to slide against the angled wall 100 in the general direction toward the wall 86 and away from the opposing wall 88. The second end 70 of the locking element 66 slides via the force of gravity 78 over the angled wall 100 as the seatback 22 transitions from the upright position 24 to the fold down position 26. The movement of the second end 70 also moves the first end 68 toward the aperture 90 of the housing 80 and eventually out of the aperture 50 of the cantilever portion 48 of the latch 44 of the lid 38, at which point the locking element 66 has transitioned to the disengaged position 76. By the time, or when, the seatback 22 transitions to the fold down position 26, the force of gravity 78 has caused the second end 70 to move adjacent to the wall 86 (with the pad 102 separating the second end 70 from the wall 86) and the first end 68 to retract from the locking element receiver 50 (here, the aperture 50) of the latch 44 and thus the locking element 66 to the disengaged position 76. Stated another way, as the seatback 22 transitions (FIG. 17) from the upright position 24 (FIG. 12) to the fold down position 26 (FIG. 10), the force of gravity 78 upon the second end 70 causes the first end 68 to disengage with the latch 44 and thus from the lid 38. The second end 70 pulls the first end 68 out of the engaged position 74 with the lid 38, such as the latch 44 of the lid 38.

In the illustrated embodiment, the second end 70 of the locking element 66 weighs more than the first end 68 of the locking element 66. In some embodiments, at least 75 percent of the weight of the locking element 66 is concentrated in the second end 70.

Therefore, the seatback 22 for the vehicle 10 is described with the storage area 36, the lid 38 providing selective access to the storage area 36, and the locking element 66 that is disengaged (while in the disengaged position 76) from the lid 38 when the seatback 22 is in the fold down position 26 but, due to the force of gravity 78, is engaged with the lid 38 (while in the engaged position 74) and prevents the lid 38 from opening (to the open position 42) as the seatback 22 transitions from the fold down position 26 to the upright position 24. Similarly, the locking element 66 prevents the lid 38 from opening when the seatback 22 is in the upright position 24 but, due to the force of gravity 78, disengages from the lid 38 to allow the lid 38 to open when the seatback 22 is in the fold down position 26. Without the locking element 66, the lid 38 could inadvertently move from the closed position 40 to the open position 42, while the seatback 22 is in the upright position 24, if an occupant of the second row of seating 16 pulled the handle portion 46 or if the seatback 22 was jolted (such as when another vehicle impacts the vehicle 10). The locking element 66 engages with the lid 38 via the force of gravity 78 when the seatback 22 transitions from the fold down position 26 to the upright position 24 to prevent the lid 38 from so opening to the open position 42. Advantageously, the locking element 66 automatically engages in that manner and, further, automatically disengages from the lid 38 via the force of gravity 78 to allow the lid 38 to be opened to the open position 42 when the seatback 22 is in the fold down position 26.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seatback for a vehicle comprising:
   an upright position;
   a fold down position;
   a latch receiver;
   a lid comprising a closed position preventing access to a storage area, an open position allowing access to the storage area, and a latch that cooperates with the latch receiver as the lid transitions from the open position to the closed position to maintain the lid in the closed position, the latch including:
      a handle portion,
      a cantilever portion that extends generally forward from the handle portion when the seatback is in the upright position and the lid is in the closed position, the cantilever portion including an aperture, and
      a catch portion extending from the cantilever portion; and
   a locking element having (i) an engaged position, when the lid is in the closed position, extending through the aperture of the cantilever portion of the latch thereby preventing the lid from transitioning from the closed position to the open position, and (ii) a disengaged position not extending through the aperture of the cantilever portion of the latch thereby not preventing the lid from transitioning from the closed position to the open position;
   wherein, the locking element transitions from the disengaged position to the engaged position via the force of gravity when the seatback transitions from the fold down position to the upright position, and transitions from the engaged position to the disengaged position when the seatback transitions from the upright position to the fold down position.

2. The seatback of claim 1 further comprising:
a forward portion and a rearward portion from the perspective of when the seatback is in the upright position;
wherein, the lid is disposed at the rearward portion of the seatback.

3. The seatback of claim 1, wherein the lid is pivotally attached such that, when the seatback is in the fold down position, the lid is configured to pivot upward as the lid transitions from the closed position to the open position.

4. The seatback of claim 1, wherein, the latch receiver is disposed above the storage area when the seatback is in the upright position.

5. The seatback of claim 1,
wherein, the catch portion includes a catch surface that opposes the latch receiver when the lid is in the closed position and there is no pulling force on the handle portion, and an angled surface that slides against the latch receiver when the seatback is in the fold down position and the lid transitions from the open position to the closed position; and
wherein, a pulling force on the handle portion of the latch causes the catch surface not to oppose the latch receiver and, when the seatback is in the fold down position, the lid is able to transition from the closed position to the open position.

6. The seatback of claim 5,
wherein, when the seatback is in the upright position and the lid is in the closed position, the locking element prevents the lid from transitioning to the open position in the event that the catch surface of the latch no longer opposes the latch receiver.

7. The seatback of claim 1,
wherein, when the lid is in the closed position, and the seatback transitions from the fold down position to the upright position, the locking element engages the latch as the locking element transitions from the disengaged position to the engaged position.

8. The seatback of claim 1,
wherein, the aperture of the cantilever portion is disposed between the handle portion and the catch portion.

9. The seatback of claim 1,
the locking element including a first end that extends through the aperture of the cantilever portion of the latch of the lid while the locking element is in the engaged position and the lid is in the closed position.

10. The seatback of claim 9,
the locking element further including a second end separated from the first end by a middle portion;
wherein, as the seatback transitions from the upright position to the fold down position, the force of gravity upon the second end causes the first end to disengage from the lid.

11. The seatback of claim 10,
wherein, at least 75% of the weight of the locking element is concentrated in the second end.

12. The seatback of claim 10 further comprising:
a housing that at least partially houses the locking element, the housing comprising:
an aperture through which the first end of the locking element extends when the locking element is in the engaged position; and
a compartment within which the second end of the locking element can move but cannot exit, the compartment including an aperture through which the middle portion of the locking element extends.

13. The seatback of claim 12,
the compartment of the housing including an angled wall relative to horizontal when the seatback is in the fold down position;
wherein, the second end of the locking element slides via the force of gravity over the angled wall as the seatback transitions from the upright position to the fold down position.

14. The seatback of claim 1,
wherein, the locking element includes a first end, a middle portion, and a second end separated from the first end by the middle portion;
wherein, when the lid is in the closed position, and the seatback transitions from the fold down position to the upright position, the locking element transitioning from the disengaged position to the engaged position includes the first end of the locking element extending through the aperture of the cantilever portion of the latch, which prevents the lid from transitioning to the open position in the event that the latch receiver no longer cooperates with the latch;
wherein, when the lid is in the closed position, as the seatback transitions from the upright position to the fold down position, the locking element transitioning from the engaged position to the disengaged position includes the force of gravity acting upon the second end to cause the first end to not extend through the aperture of the cantilever portion of the latch; and
wherein the lid is pivotally attached such that, when the seatback is in the fold down position, the lid is configured to pivot upward as the lid transitions from the closed position to the open position.

15. The seatback of claim 14 further comprising:
a housing that at least partially houses the locking element, the housing comprising:
an aperture through which the first end of the locking element extends when the locking element is in the engaged position; and
a compartment within which the second end of the locking element can move but cannot exit, the compartment including an aperture through which the middle portion of the locking element extends and a downward angled wall relative to horizontal when the seatback is in the fold down position;
wherein, when the lid is in the closed position, and the seatback transitions from the upright position to the fold down position, the locking element transitioning from the engaged position to the disengaged position includes the second end of the locking element sliding over the downward angled wall of the compartment of the housing, which causes the first end of the locking element to retract from the aperture of the cantilever portion of the latch;
wherein, the catch portion of the latch includes a catch surface that opposes the latch receiver when the lid is in the closed position and there is no pulling force on the handle portion, and an angled surface that slides against the latch receiver when the seatback is in the fold down position and the lid transitions from the open position to the closed position;
wherein, a pulling force on the handle portion of the latch causes the catch surface not to oppose the latch receiver and, when the seatback is in the fold down position, the lid is able to transition from the closed position to the open position; and wherein, when the seatback is in the upright position and the lid is in the closed position, the first end of the locking element extending through the aperture of the cantilever portion of the latch prevents the lid from transitioning to the open position in the event that the catch surface of the latch no longer opposes the latch receiver.

16. A vehicle seatback comprising:
a storage area;
a lid providing selective access to the storage area; and
a locking element including a first end, a second end, and a middle portion that separates the first end from the second end, wherein (i) the first end engages the lid due to the force of gravity and prevents the lid from opening as the seatback transitions from a fold down position to an upright position, and (ii) as the seatback transitions from the upright position to the fold down position, the force of gravity upon the second end causes the first end to disengage from the lid thereby no longer preventing the lid from opening.

17. The vehicle seatback of claim 16,
the vehicle seatback further comprising:
a housing that at least partially houses the locking element, the housing comprising:
an aperture through which the first end of the locking element extends when the first end of the locking element engages the lid; and
a compartment within which the second end of the locking element can move but cannot exit, the compartment including an aperture through which the middle portion of the locking element extends.

18. The vehicle seatback of claim 17,
the compartment of the housing including an angled wall relative to horizontal when the seatback is in the fold down position;
wherein, the second end of the locking element slides via the force of gravity over the angled wall as the seatback transitions from the upright position to the fold down position thereby pulling the first end of the locking element and disengaging the first end of the locking element from the lid.

19. A vehicle seatback comprising:
a latch receiver;
a storage area;
a lid comprising an open position providing access to the storage area, a closed position denying access to the storage area, and a latch that cooperates with the latch receiver as the lid transitions from the open position to the closed position to maintain the lid in the closed position; and
a locking element comprising a first end, a middle portion, and a second end separated from the first end by the middle portion,
wherein, when the lid is in the closed position, and the seatback transitions from a fold down position to an upright position, the first end of the locking element engages the latch, which prevents the lid from transitioning to the open position in the event that the latch no longer cooperates with the latch receiver to maintain the lid in the closed position; and
wherein, when the lid is in the closed position, as the seatback transitions from the upright position to the fold down position, the force of gravity acts upon the second end of the locking element to cause the first end of the locking element to disengage from the latch.

20. The vehicle seatback of claim 19 further comprising:
a housing that at least partially houses the locking element, the housing comprising:
an aperture through which the first end of the locking element extends when the locking element engages the latch; and
a compartment within which the second end of the locking element can move but cannot exit, the compartment including (i) an aperture through which the middle portion of the locking element extends and (ii) an angled wall relative to horizontal when the seatback is in the fold down position;
wherein, the second end of the locking element slides via the force of gravity over the angled wall as the seatback transitions from the upright position to the fold down position.

* * * * *